US012384690B1

(12) United States Patent
Abdulkhair et al.

(10) Patent No.: US 12,384,690 B1
(45) Date of Patent: Aug. 12, 2025

(54) g-C3N4@CuO/MgAl2O4 NANOCOMPOSITE FOR PHOTOCATALYTIC DEGRADATION OF POLLUTANTS IN CONTAMINATED WATER

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Abdel Fattah Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/193,772

(22) Filed: Apr. 29, 2025

(51) Int. Cl.
*C02F 1/30* (2023.01)
*B82Y 30/00* (2011.01)
*C01B 32/15* (2017.01)
*C01F 5/22* (2006.01)

(52) U.S. Cl.
CPC ............... *C01F 5/22* (2013.01); *B82Y 30/00* (2013.01); *C01B 32/15* (2017.08); *C02F 1/30* (2013.01); *C01B 2204/22* (2013.01); *C01B 2204/32* (2013.01); *C01P 2002/01* (2013.01); *C01P 2002/32* (2013.01); *C01P 2002/77* (2013.01); *C01P 2002/90* (2013.01); *C01P 2004/04* (2013.01); *C01P 2006/12* (2013.01); *C01P 2006/14* (2013.01); *C01P 2006/16* (2013.01); *C01P 2006/40* (2013.01)

(58) Field of Classification Search
CPC ..... C02F 1/30; C02F 1/32; B09B 3/00; G21F 9/00
See application file for complete search history.

(56) References Cited

FOREIGN PATENT DOCUMENTS

| CN | 111659434 B | 4/2023 |
| CN | 118237085 A | 6/2024 |
| CN | 119034782 A | 11/2024 |

OTHER PUBLICATIONS

Worachita Wongtawee, et al., "Photocatalytic activity under visible light illumination of organic dyes over g-C3N4/MgAl2O4 nanocomposite", Journal of the Indian Chemical Society, vol. 99, Issue 8, Aug. 2022, 100628, 9 Pages.

Milad Zehtab Salmasi, et al., "Spinel MgAl2O4 nanospheres coupled with modified graphitic carbon nitride nanosheets as an efficient Z-scheme photocatalyst for photodegradation of organic contaminants", Applied Surface Science, vol. 585, May 30, 2022, 152615, 10 Pages.

D. Venkatesh, et al., "Microwave-assisted synthesis, characterization, photocatalytic degradation of antibiotics, and fluorometric selective sensing activity of g-C3N4 supported CuO composites", Journal of Fluorescence, vol. 33, May 2023, pp. 987-1002, 16 Pages.

Yue Zhao et al., "Photocatalytic removal of antibiotics on g-C3N4 using amorphous cuo as Cocatalysts", Frontiers in Chemistry, vol. 9, 2021, 797738, 9 pages.

*Primary Examiner* — Stuart L Hendrickson
(74) *Attorney, Agent, or Firm* — Oblon, McClelland, Maier & Neustadt, L.L.P.

(57) ABSTRACT

A method of photocatalytic degradation includes contacting a nanocomposite with a solution including one or more pollutants. The nanocomposite is a graphite-phase carbon nitride copper oxide and magnesium aluminum oxide (g-$C_3N_4$@CuO/MgAl$_2$O$_4$) material and includes a graphite-phase carbon nitride (g-$C_3N_4$) in an amount of 2 to 20 percent by weight (wt. %), copper oxide in an amount of 1 to 10 wt. %, and magnesium aluminum oxide (MgAl$_2$O$_4$) in an amount of 75 to 95 wt. % based on a total weight of the g-$C_3N_4$@CuO/MgAl$_2$O$_4$ material. The method further includes irradiating the nanocomposite with light having a wavelength of 400 to 800 nm in the absence of UV light to photocatalytically degrade the one or more pollutants in the solution.

20 Claims, 11 Drawing Sheets g-C3N4@CuO/MgAl2O4 NANOCOMPOSITE FOR PHOTOCATALYTIC DEGRADATION OF POLLUTANTS IN CONTAMINATED WATER

BACKGROUND

Technical Field

The present disclosure is directed towards water decontamination techniques, and more particularly, relates to a method of photocatalytic degradation using a nanocomposite comprising a graphite-phase carbon nitride copper oxide and magnesium aluminum oxide (g-$C_3N_4$@CuO/MgAl$_2$O$_4$) material for the decomposition of pollutants from contaminated water.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

With the advent of industrialization, wastewater generation has contributed to environmental issues. Industrial wastewater contains toxic, non-biodegradable organic compounds, including dyes, pesticides, plasticizers, detergents, and pharmaceuticals, among others. Inorganic and organic contaminants both pose threats to the environment, leading to detrimental effects for biodiversity, humans, and animals. The global environment presently faces pollution from heavy metal ions, which are toxic, carcinogenic, and non-biodegradable. Heavy metal pollution results from human activities in chemical industry, textile industry, leather industry, plastic industry, mining industry, battery industry, paint industry, pigment industry, paper industry, pulp industry, and the like. The release of toxic metals into water without treatment threatens biota, as metal ions may enter food chains and cause health issues, including cancer, nervous system damage, kidney failure, and even death at high levels.

A plurality of methods, including ion exchange, precipitation, coagulation, membrane filtration, reverse osmosis, and adsorption techniques, have been employed for the removal of toxic metal ions from polluted water. Industrial wastewater treatment methods concentrate or separate contaminants, without fully removing or decomposing the contaminants into biodegradable and/or less toxic compounds, such as carbon dioxide ($CO_2$), water ($H_2O$), and/or inorganic salts. Among present techniques, adsorption methods are desirable as adsorption techniques may possess high exclusion capability of low ion concentrations in trace amounts, offering a cost-effective and simple alternative to classic water purification methods. Recently, nanomaterials have been explored as adsorbents for the removal of various pollutants from water and wastewater, including dyes, heavy metals, pharmaceuticals, and phenolic compounds. Due to their chemical and physical properties, nanomaterials offer good removal efficiencies compared to traditional adsorbents. Nanomaterials may be advanced materials which embed nanoparticles in a matrix to enhance properties like strength, stability, and conductivity. Nanomaterials with dimensions in the nano-scale range of 1 nanometer (nm) to 100 nm may offer desirable properties and advantages, combining benefits of metals and adsorbents, making them a renewable alternative to conventional methods. The heavy metals, like cadmium (Cd), chromium (Cr), copper (Cu), iron (Fe), lead (Pb), nickel (Ni), silver (Ag), zinc (Zn), and uranium (U), are found in their ionic forms in industrial wastewater. Carbon nanomaterials (CNs) provide a high specific surface area and good electrical conductivity, enhancing contact with electrolytes and enabling efficient charge/discharge processes. CNs may be loaded with electrochemically active species, improving the overall performance of the CNs [Ibrahim, T. G. et al., Eliminating manifold pharmaceutical pollutants with carbon nanoparticles driven via a short-duration ball-milling process, *Surfaces*, 2024, 7, 493-507]. Nanomaterials are cost-effective and environmentally friendly. The structural characteristics of nanocomposites may be used in catalysis, energy storage, environmental remediation, electronics, and biomedicine, offering good performance over other materials.

Synthesizing nanocomposites may be challenging due to high temperature requirements and lengthy processing, which often result in irregular particle sizes. Synthesis techniques used for metal oxide nanocomposites often lead to inconsistent porosity, high operational costs, and non-uniform particle size distribution due to high temperatures and extensive post-treatment steps. These challenges hinder material performance and commercial viability. Efforts have focused on developing efficient and reproducible synthesis methods to increase the performance of mixed metal oxide nanocomposites. Altering nanocomposite properties may pose challenges such as reduced stability, lower reusability, and potential toxicity. While various nanocomposite sorbent materials have been developed for wastewater treatment, many show good adsorption performance but suffer from a low repeatable utilization rate, leading to resource waste, higher costs, and potential secondary pollution. To address such issues, strategies such as developing synthesis methods, incorporating stabilizing agents, and enhancing recyclability are being employed. Hence, there arises a need for developing efficient and cost-effective nanomaterials to be used in methods for reducing contaminant concentration in wastewater.

Accordingly, an object of the present disclosure is to provide a method of photocatalytic degradation using a nanocomposite comprising a graphite-phase carbon nitride copper oxide and magnesium aluminum oxide (g-$C_3N_4$@CuO/MgAl$_2$O$_4$) material, that may circumvent the drawbacks and limitations, such as low degradation rates, limited reusability, environmental concerns, and complex synthesis procedures, of the methods and materials already known in the art.

SUMMARY

In an exemplary embodiment, a method of photocatalytic degradation is described. The method includes contacting a nanocomposite with a solution including one or more pollutants. The nanocomposite is a graphite-phase carbon nitride copper oxide and magnesium aluminum oxide (g-$C_3N_4$@CuO/MgAl$_2$O$_4$) material. The g-$C_3N_4$@CuO/MgAl$_2$O$_4$ material includes a graphite-phase carbon nitride (g-$C_3N_4$) in an amount of 2 to 20 percent by weight (wt. %), copper oxide in an amount of 1 to 10 wt. %, and magnesium aluminum oxide (MgAl$_2$O$_4$) in an amount of 75 to 95 wt. % based on a total weight of the g-$C_3N_4$@CuO/MgAl$_2$O$_4$ material. The method further includes irradiating the nanocomposite with light having a wavelength of 400 to 800 nm in the absence of light to photocatalytically degrade the one or more pollutants in the solution.

In some embodiments, the nanocomposite has a band gap energy value of 1.6 to 1.7 eV.

In some embodiments, irradiating the nanocomposite occurs at a wavelength of 480 to 700 nm.

In some embodiments, the $g-C_3N_4$ is in the form of nanosheets having an average length of 100 to 500 nanometers (nm) and an average width of 50 to 250 nm.

In some embodiments, the copper oxide and the $MgAl_2O_4$ are in the form of nanoparticles having an average size of 2 to 10 nm and the copper oxide and the $MgAl_2O_4$ nanoparticles are dispersed on the $g-C_3N_4$ nanosheets.

In some embodiments, the nanocomposite has a Brunauer-Emmett-Teller (BET) surface area of 15 to 30 square meters per gram ($m^2$ $g^{-1}$).

In some embodiments, the nanocomposite is porous and has an average pore diameter of 5 to 10 nm.

In some embodiments, the nanocomposite is porous and has an average pore volume of 0.01 to 0.2 cubic centimeters per gram ($cm^3$ $g^{-1}$).

In some embodiments, the nanocomposite is porous, and the pores are in the form of slits.

In some embodiments, the $g-C_3N_4@CuO/MgAl_2O_4$ material comprises a graphite-phase carbon nitride ($g-C_3N_4$) in an amount of 5 to 15 percent by weight (wt. %), copper oxide in an amount of 3 to 7 wt. %, and magnesium aluminum oxide ($MgAl_2O_4$) in an amount of 80 to 90 wt. % based on a total weight of the $g-C_3N_4@CuO/MgAl_2O_4$ material.

In some embodiments, the nanocomposite is crystalline.

In some embodiments, the nanocomposite includes a copper oxide (CuO) phase, a magnesium oxide (MgO) phase, a magnesium aluminum oxide ($MgAl_2O_4$) phase, and a graphite-phase carbon nitride ($g-C_3N_4$) phase.

In some embodiments, the $MgAl_2O_4$ phase is spinel.

In some embodiments, the MgO phase is cubic.

In some embodiments, the nanocomposite does not include aluminum oxide ($Al_2O_3$).

In some embodiments, the one or more pollutants is a dye.

In some embodiments, the irradiating occurs for 0.5 to 90 minutes.

In some embodiments, the irradiating occurs at a temperature of 10 to 50° C.

In some embodiments, the nanocomposite is made by a process including mixing a magnesium salt, an aluminum salt, a copper salt, and a fuel in water to form a mixture. The process further includes, heating the mixture to form a solid product, calcinating the solid product at a temperature of 600 to 800° C. for 2 to 4 hours to form a product, mixing the product with urea and heating to a temperature of 550 to 650° C. for 20 to 60 minutes to form the nanocomposite.

In some embodiments, the fuel is menthol.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
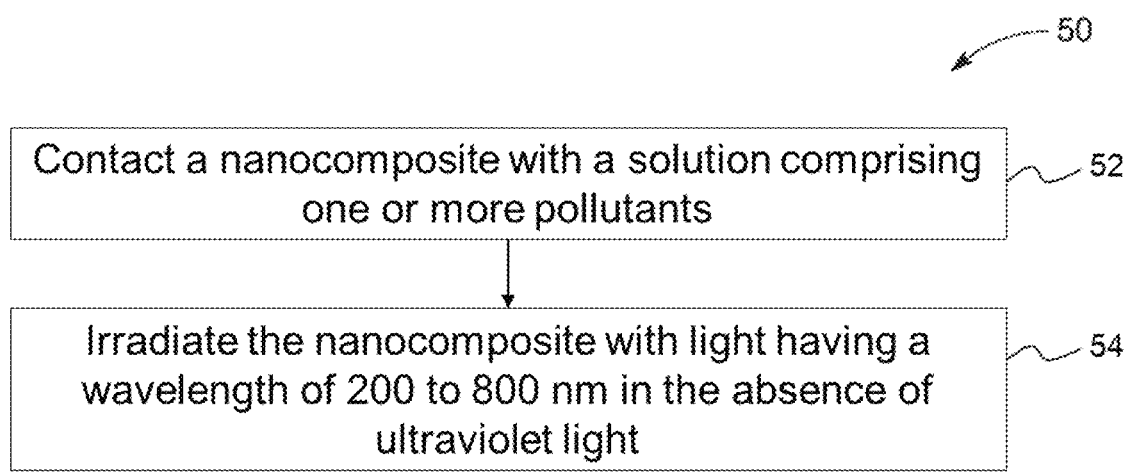
FIG. 1 is an exemplary flow chart of a method of photocatalytic degradation, according to certain embodiments.

In the drawings, like reference numerals will be used to designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "average particle size" refers to the mean size of particles in a sample, typically determined by measuring the distribution of particle sizes and calculating the average value, often through techniques such as dynamic light scattering (DLS) and/or scanning electron microscopy (SEM).

As used herein, the term "pore size" refers to the average diameter or width of pores within a material, typically determined by methods such as nitrogen adsorption-desorption, mercury intrusion porosimetry, and/or scanning electron microscopy (SEM). Pore size is a parameter for characterizing the porosity and surface area of materials, especially in nanocomposites or catalysts.

As used herein, the term "surface area" refers to the total area of an exposed surface of a material per unit of mass or volume. It is typically measured in square meters per gram ($m^2/g$) and is a parameter for characterizing the adsorption capacity, reactivity, and porosity of a material, such as a nanocomposite. Surface area provides insights into how well a material can interact with other substances, such as molecules of a dye or other pollutants in a solution.

As used herein, the term "nanocomposite" refers to a material composed of two or more distinct components, at least one of which has a nanoscale structure, typically in the range of 1 to 100 nm. These components are combined to form a composite material that exhibits properties, such as increased strength, electrical conductivity, chemical reactivity, and/or thermal stability, compared to the individual components. Nanocomposites may be used in various applications, including catalysis, environmental remediation, electronics, and materials science.

As used herein, the term "slit" or "slit-like" refers to an opening having a height that is substantially longer than the width of the opening.

As used herein, the term "photocatalytic degradation" refers to an oxidative process, which can be used to break down (i.e., degrade) pollutants with high concentration, complexity, and/or low biodegradability. Photocatalytic degradation uses light energy to drive pollutant degradation. Oxidation and hydrolysis of pollutants occurs by absorption of photons in three electromagnetic regions: visible (vis), ultraviolet (UV), and infrared (IR). Activation of photocatalytic material with UV/vis/IR light leads to migration of photo responsive electrons from a valence band to a conduction band, generating photo-induced electron and hole pairs. Photo-generated electron and hole pairs react with oxygen, water, and hydroxyl groups to produce reactive oxygen species, including hydroxyl radicals and superoxide radical anions. These radicals can interact with pollutant molecules, resulting in complete or partial degradation of pollutants. As used herein, the term "band gap" refers to the energy distance (in electron volts) between the valence band and the conduction band. A band gap is the minimum energy needed to excite an electron to a state in the conduction band where it can participate in conduction.

Aspects of the present disclosure pertain to a method of photocatalytic degradation using a nanocomposite for pollutant decomposition in water. FIG. 1 illustrates a schematic flow chart of a method 50 of photocatalytic degradation. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes contacting a nanocomposite with a solution comprising one or more pollutants. The nanocomposite is a graphite-phase carbon nitride copper oxide and magnesium aluminum oxide (g-$C_3N_4$@CuO/MgAl$_2$O$_4$) material. The g-$C_3N_4$@CuO/MgAl$_2$O$_4$ material comprises a graphite-phase carbon nitride (g-$C_3N_4$) in an amount of 2 to 20 percent by weight (wt. %), copper oxide in an amount of 1 to 10 wt. %, and magnesium aluminum oxide (MgAl$_2$O$_4$) in an amount of 75 to 95 wt. % based on a total weight of the g-$C_3N_4$@CuO/MgAl$_2$O$_4$ material.

In some embodiments, the nanocomposite or g-$C_3N_4$@CuO/MgAl$_2$O$_4$ material includes a graphite-phase carbon nitride (g-$C_3N_4$) in an amount of 5 to 15 percent by weight (wt. %), copper oxide in an amount of 3 to 7 wt. %, and magnesium aluminum oxide (MgAl$_2$O$_4$) in an amount of 80 to 90 wt. %. Percent by weight is based on a total weight of the g-$C_3N_4$@CuO/MgAl$_2$O$_4$ material. The nanocomposite adsorbs the one or more pollutants.

In some embodiments, graphite-phase carbon nitride (g-$C_3N_4$) may be present in the g-$C_3N_4$@CuO/MgAl$_2$O$_4$ material in an amount of 5 to 15 percent by weight (wt. %), preferably 6 to 14 wt. %, preferably 7 to 13 wt. %, preferably 8 to 12 wt. %, more preferably 9 to 11 wt. %, and yet more preferably 9.5 to 10.5 wt. %. In a preferred embodiment, graphite-phase carbon nitride (g-$C_3N_4$) is present in the g-$C_3N_4$@CuO/MgAl$_2$O$_4$ material in an amount of 10 wt. % based on the total weight of the g-$C_3N_4$@CuO/MgAl$_2$O$_4$ material.

In some embodiments, copper oxide may be present in the g-$C_3N_4$@CuO/MgAl$_2$O$_4$ material in an amount of 3 to 7 wt. %, preferably 3.5 to 6.5 wt. %, more preferably 4 to 6 wt. %, and yet more preferably 4.5 to 5.5 wt. %. In a preferred embodiment, copper oxide is present in the g-$C_3N_4$@CuO/MgAl$_2$O$_4$ material in an amount of 5 wt. % based on the total weight of the g-$C_3N_4$@CuO/MgAl$_2$O$_4$ material.

In some embodiments, magnesium aluminum oxide (MgAl$_2$O$_4$) may be present in the g-$C_3N_4$@CuO/MgAl$_2$O$_4$ material in an amount of 80 to 90 wt. %, preferably 81 to 89 wt. %, preferably 82 to 88 wt. %, preferably 83 to 87 wt. %, more preferably 84 to 86 wt. %, and yet more preferably 84.5 to 85.5 wt. %. In a preferred embodiment, magnesium aluminum oxide (MgAl$_2$O$_4$) is present in the g-$C_3N_4$@CuO/MgAl$_2$O$_4$ material in an amount of 85 wt. % based on the total weight of the g-$C_3N_4$@CuO/MgAl$_2$O$_4$ material.

At step 54, the method 50 includes irradiating the nanocomposite with light having a wavelength of 400 to 800 nm, preferably 450 to 750 nm, and preferably 500 to 600 nm, in the absence of ultraviolet (UV) light to photocatalytically degrade the one or more pollutants in the solution. As used herein, "the absence of UV light" refers to less than 5%, preferably less than 4%, preferably less than 3%, preferably less than 2%, preferably less than 1%, more preferably less than 0.5%, and yet more preferably less than 0.1% of light corresponding to ultraviolet wavelengths (100 to 400 nm) reaches the solution comprising one or more pollutants based on a total emission/radiation of light. In some embodiments, the nanocomposite may be irradiated with natural light (i.e., solar radiation), artificial light, a combination thereof, and the like. In some embodiments, the nanocomposite may be irradiated with visible light, ultraviolet light, infrared radiation, a combination thereof, and the like. In some embodiments, irradiating the nanocomposite occurs at a wavelength of 480 to 700 nm, preferably 500 to 680 nm, preferably 520 to 660 nm, and preferably 540 to 640 nm. In some embodiments, the irradiating occurs for 0.5 to 90 minutes, preferably 1 to 75 minutes, preferably 2 to 60 minutes, preferably 5 to 50 minutes, preferably 10 to 45 minutes, and preferably 20 to 30 minutes. In some embodiments, the irradiating occurs at a temperature of 10 to 50° C., preferably 15 to 45° C., preferably 20 to 40° C., and preferably 30 to 35° C. In some embodiments, the one or more pollutants may be degraded partially. In other embodiments, the one or more pollutants may be degraded completely into $CO_2$, $H_2O$, $N_2$, a combination thereof, and the like.

In an embodiment, contacting the nanocomposite with the solution comprising one or more pollutants includes flowing the solution through a cylindrical reactor, preferably a fluidized bed reactor, orientated in a vertical manner containing the nanocomposite in a reactor bed. In some embodiments, the cylindrical reactor may be a rectangular reactor, a semi-cylindrical reactor, a square reactor, or any reactor shape known in the art. In some embodiments, the fluidized bed reactor may be a fixed-bed reactor, a trickle-bed reactor, a batch reactor, a continuous stirred-tank reactor, and the like. In some embodiments, the reactor bed may be any reactor bed known in the art. In some embodiments, the solution is flowed (i.e., pumped, passed) through a bottom face (i.e., reactor bed) of the cylindrical reactor. In some embodiments the cylindrical reactor has a pane (i.e., a sight glass) on an outer face of the cylindrical reactor (i.e., not the bottom face of the cylindrical or a top face of the reactor). In some embodiments, the pane on the outer surface of the cylindrical reactor includes an ultraviolet (UV) cut filter and/or an infrared (IR) cut filter to avoid irradiating the nanocomposite with UV light and IR radiation. As used herein, the term "UV cut filter" refers to a filter which partially removes or mostly removes (i.e., removes at least 51%, preferably at least 60%, preferably at least 75%, preferably at least 90%, preferably at least 95%, preferably at least 99%, and preferably at least 99.9%) of UV radiation passing through the filter. As used herein, the term "IR cut filter" refers to a filter which partially removes or mostly removes (i.e., removes at least 51%, preferably at least 60%, preferably at least 75%, preferably at least 90%, preferably at least 95%, preferably at least 99%, and preferably at least 99.9%) of IR radiation passing through the filter. In some embodiments, the pane on the outer surface of the cylindrical reactor allows only visible light and/or radiation to irradiate the nanocomposite in the cylindrical reactor to photocatalytically degrade the one or more pollutants in the solution.

In some embodiments, the nanocomposite in a fluidized bed reactor has a first height. In some embodiments, the solution comprising the one or more pollutants is flowed through the fluidized bed reactor, contacting the solution with the nanocomposite and stirring and/or agitating the nanocomposite to a second height in which visible light passes through the pane comprising a UV cut filter and an IR cut filter to irradiate the nanocomposite and photocatalytically degrade the one or more pollutants in the solution.

In some embodiments, the one or more pollutants is a dye. A dye is a colored substance that chemically binds to a material it may be intended to color. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, 0-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; rhodamine dyes such as rhodamine, rhodamine 6G, rhodamine 123, rhodamine B, sulforhodamine 101, and sulforhodamine B; indigo carmine, a combination thereof, and the like.

In other embodiments, the one or more pollutants may be pharmaceutical compositions, organic compounds, a combination thereof, and the like.

Figure 2:
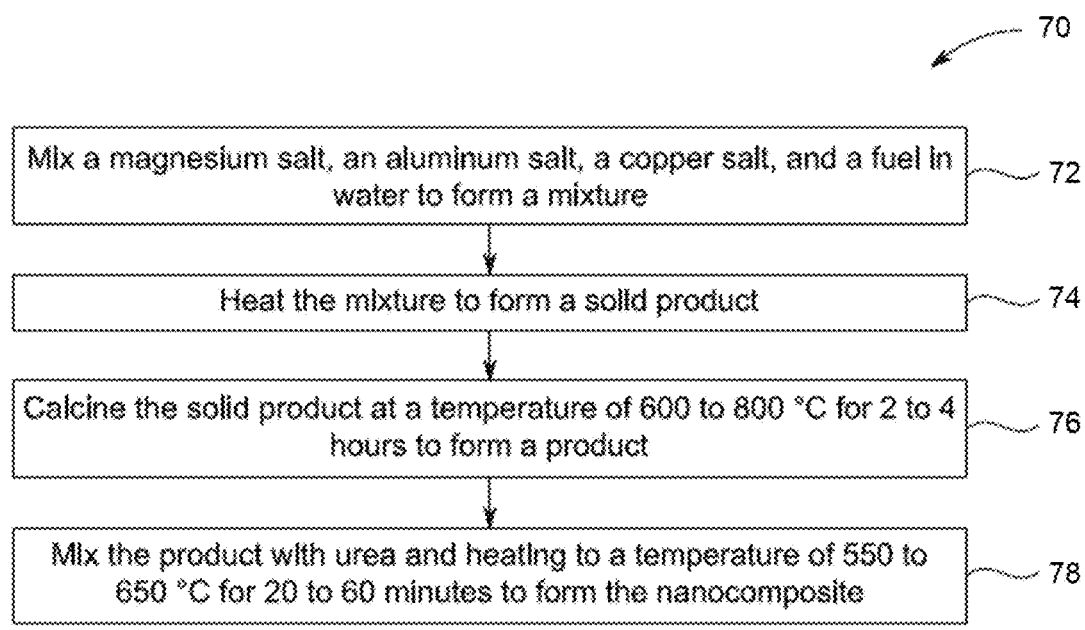
FIG. 2 is an exemplary flow chart of a method of making a nanocomposite, according to certain embodiments.

FIG. 2 illustrates a schematic flow chart of a method 70 of forming the nanocomposite. The order in which the method 70 is described is not intended to be construed as a limitation, and any number of the described method steps can be combined to implement the method 70. Additionally, individual steps may be removed or skipped from the method 70 without departing from the spirit and scope of the present disclosure.

At step 72, the method 70 includes mixing a magnesium salt, an aluminum salt, a copper salt, and a fuel in water to form a mixture. In some embodiments, the magnesium salt may include, but is not limited to, magnesium chloride ($MgCl_2$), magnesium sulfate ($MgSO_4$), magnesium nitrate ($Mg(NO_3)_2$), magnesium carbonate ($MgCO_3$), magnesium oxide (MgO), magnesium hydroxide ($Mg(OH)_2$), magnesium fluoride ($MgF_2$), magnesium bromide ($MgBr_2$), magnesium iodide ($MgI_2$), magnesium phosphate ($Mg_3(PO_4)_2$), magnesium perchlorate ($Mg(ClO_4)_2$), magnesium chromate ($MgCrO_4$), magnesium dichromate ($MgCr_2O_7$), magnesium silicate ($Mg_2SiO_4$), magnesium borate ($Mg_3(BO_3)_2$), magnesium arsenate ($Mg_3(AsO_4)_2$), magnesium sulfite ($MgSO_3$), magnesium thiosulfate ($MgS_2O_3$), magnesium molybdate ($MgMoO_4$), magnesium tungstate ($MgWO_4$), magnesium vanadate ($Mg_3(VO_4)_2$), magnesium zirconate ($MgZrO_3$), magnesium titanate ($MgTiO_3$), magnesium gallate ($MgGa_2O_4$), magnesium hexafluorosilicate ($MgSiF_6$), magnesium hexafluoroaluminate ($MgAlF_6$), magnesium pyrophosphate ($Mg_2P_2O_7$), magnesium hypophosphite ($Mg(H_2PO_2)_2$), magnesium hydrogen phosphate ($MgHPO_4$), magnesium bisulfate ($Mg(HSO_4)_2$), magnesium thiocyanate ($Mg(SCN)_2$), and a combination thereof. In preferred embodiment, the magnesium salt is magnesium nitrate.

In some embodiments, the aluminum salt may include, but is not limited to, aluminum chloride ($AlCl_3$), aluminum sulfate ($Al_2(SO_4)_3$), aluminum phosphate ($AlPO_4$), aluminum fluoride ($AlF_3$), aluminum hydroxide ($Al(OH)_3$), aluminum acetate ($Al(CH_3COO)_3$), aluminum oxide ($Al_2O_3$), aluminum bromide ($AlBr_3$), aluminum iodide ($AlI_3$), aluminum borate ($AlBO_3$), aluminum silicate ($Al_2SiO_5$), sodium aluminate ($NaAlO_2$), potassium aluminate ($KAlO_2$), aluminum carbonate ($Al_2(CO_3)_3$), aluminum perchlorate ($Al(ClO_4)_3$), aluminum pyrophosphate ($Al_4(P_2O_7)_3$), aluminum sulfite ($Al_2(SO_3)_3$), aluminum chromate ($Al_2(CrO_4)_3$), aluminum permanganate ($Al(MnO_4)_3$), aluminum zirconate ($Al_2ZrO_5$), aluminum titanate ($Al_2TiO_5$), aluminum molybdate ($Al_2(MoO_4)_3$), aluminum tungstate ($Al_2(WO_4)_3$), aluminum gallate ($AlGa_3$), aluminum nitride (AlN), aluminum hydroxynitrate ($Al(OH)_x(NO_3)_y$), aluminum metaborate ($Al(BO_2)_3$), aluminum hydride ($AlH_3$), aluminum sulfide ($Al_2S_3$), aluminum telluride ($Al_2Te_3$), aluminum arsenate ($AlAsO_4$), aluminum vanadate ($AlVO_4$), basic aluminum chloride ($Al_2(OH)_5Cl$), and a combination thereof. In preferred embodiment, the aluminum salt is aluminum nitrate.

In some embodiments, the copper salt may include, but is not limited to, copper sulfate, copper chloride, copper carbonate, copper bromide, copper iodide, copper perchlorate, copper phosphate, copper arsenate, copper silicate, copper chromate, copper fluoride, copper hydroxide, copper cyanide, copper pyrophosphate, copper sulfite, copper thiocyanate, copper molybdate, copper tungstate, copper antimonate, copper borate, copper titanate, copper tungstophosphate, copper vanadate, copper zirconate, copper bromate, copper hypophosphite, copper phosphonate, and a mixture thereof. In a preferred embodiment, the copper salt is copper nitrate.

Fuel aids in combustion synthesis, reducing energy requirement. In some embodiments, the fuel may include, ethanol, propane, butane, hydrogen, diesel, gasoline, kerosene, natural gas, biodiesel, ethanol blend, ethanol fuel, acetone, isopropanol, acetylene, glycerol, methane, n-butanol, pentane, hexane, heptane, octane, decane, methanol, isobutanol, propanol, ethyl acetate, isopropyl alcohol, diethyl ether, cyclohexane, toluene, xylene, benzene, naphtha, turpentine, menthol, vegetable oil, palm oil, sunflower oil, corn oil, rapeseed oil, algae oil, a combination thereof, and the like. In a preferred embodiment, the fuel is menthol.

At step 74, the method 70 includes heating the mixture to form a solid product. In some embodiments, the solution is heated at a temperature of 50 to 200° C., preferably 55 to 190° C., preferably 60 to 180° C., preferably 65 to 170° C., preferably 70 to 160° C., preferably 75 to 150° C., preferably 80 to 140° C., preferably 85 to 130° C., more preferably 90 to 120° C., and yet more preferably 95 to 110° C.

At step 76, the method 70 includes calcinating the solid product at a temperature of 600 to 800° C., preferably 610 to 790° C., preferably 620 to 780° C., preferably 630 to 770° C., preferably 640 to 760° C., preferably 650 to 750° C., preferably 660 to 740° C., preferably 670 to 730° C., preferably 680 to 720° C., more preferably 690 to 710° C., and yet more preferably about 700° C., for 2 to 4 hours, preferably 2.1 to 3.9 hours, preferably 2.2 to 3.8 hours, preferably 2.3 to 3.7 hours, preferably 2.4 to 3.6 hours, preferably 2.5 to 3.5 hours, preferably 2.6 to 3.4 hours, preferably 2.7 to 3.3 hours, preferably 2.8 to 3.2 hours, more preferably 2.9 to 3.1 hours, and yet more preferably about 3 hours to form a product. In a preferred embodiment, the solid is calcined at a temperature of 700° C. for 3 hours.

At step 78, the method 70 includes mixing the product with urea and heating to a temperature of 550 to 650° C., preferably 555 to 645° C., preferably 560 to 640° C., preferably 565 to 635° C., preferably 570 to 630° C., preferably 575 to 625° C., preferably 580 to 620, preferably 585 to 615° C., preferably 590 to 610° C., more preferably 595 to 605° C., and more preferably about 600° C., for 20 to 60 minutes, preferably 25 to 55 minutes, preferably 30 to 50 minutes, more preferably 35 to 45 minutes, and more preferably about 40 minutes, to form the nanocomposite. Urea may serve as a precursor for $g\text{-}C_3N_4$ formation. In a preferred embodiment, the mixture is heated at a temperature of 600° C. for 40 minutes.

In some embodiments, the nanocomposite has a band gap energy value of 1.6 to 1.7 eV, preferably 1.61 to 1.69 eV, preferably 1.62 to 1.68 eV, preferably 1.63 to 1.67 eV, more preferably 1.64 to 1.66 eV, and yet more preferably about 1.658 eV.

In some embodiments, the $g\text{-}C_3N_4$ may exist in various morphological shapes, such as nanowires, nanosheets, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanofloweres, mixtures thereof, and the like. In preferred embodiment, the $g\text{-}C_3N_4$ is in the form of nanosheets.

In some embodiments, the $g\text{-}C_3N_4$ is in the form of nanosheets having an average length of 100 to 500 nm, preferably 125 to 450 nm, preferably 150 to 400 nm, preferably 175 to 350 nm, preferably 200 to 300 nm, preferably 210 to 250 nm, more preferably 220 to 230 nm, and yet more preferably about 222 nm, and an average width of 50 to 250 nm, preferably 75 to 200 nm, preferably 100 to 150 nm, preferably 125 to 145 nm, more preferably 130 to 140 nm, and yet more preferably about 135 nm.

In some embodiments, the copper oxide and the $MgAl_2O_4$ may exist in various morphological shapes, such as nanowires, nanosheets, nanocrystals, nanoparticles, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, mixtures thereof, and the like. In preferred embodiment, the copper oxide and the $MgAl_2O_4$ is in the form of spherical nanoparticles. In some embodiments, the copper oxide and the $MgAl_2O_4$ are in the form of spherical nanoparticles and are dispersed on the $g\text{-}C_3N_4$ nanosheets.

In some embodiments, the copper oxide and the $MgAl_2O_4$ is in the form of spherical nanoparticles having an average size of 2 to 10 nm, preferably 3 to 9 nm, preferably 4 to 8 nm, preferably 4.5 to 7 nm, more preferably 5 to 6 nm, and yet more preferably about 5.4 nm.

In some embodiments, the nanocomposite has a Brunauer-Emmett-Teller (BET) surface area of 15 to 30 $m^2/g$, preferably 17 to 29 $m^2/g$, preferably 18 to 28 $m^2/g$, preferably 19 to 27 $m^2/g$, preferably 20 to 26 $m^2/g$, preferably 21 to 25 $m^2/g$, preferably 22 to 24.5 $m^2/g$, more preferably 23 to 24 $m^2/g$, and yet more preferably about 23.21 $m^2/g$.

In some embodiments, the nanocomposite is porous and has an average pore diameter of 5 to 10 nm, preferably 6 to 9.5 nm, preferably 7 to 9 nm, more preferably 8 to 8.5 nm, and yet more preferably about 8.34 nm.

In some embodiments, the nanocomposite is porous and has an average pore volume of 0.01 to 0.2 $cm^3/g$, preferably 0.02 to 0.18 $cm^3/g$, preferably 0.03 to 0.16 $cm^3/g$, preferably 0.04 to 0.14 $cm^3/g$, preferably 0.05 to 0.12 $cm^3/g$, preferably 0.06 to 0.1 $cm^3/g$, preferably 0.07 to 0.09 $cm^3/g$, more preferably 0.075 to 0.085 $cm^3/g$, and yet more preferably about 0.081 $cm^3/g$.

In some embodiments, the nanocomposite is porous. In some embodiments, the nanocomposite is porous, and the pores may be in the form of cylinders, cones, spheres, tubes, funnels, irregular shapes, spherical voids, mesopores, micropores, macropores, capillaries, hexagonal pores, cubic pores, elongated pores, elliptical pores, slits, slit-like channels, plate-like pores, interconnected pores, branched pores, toroidal pores, spherical voids, cylindrical channels, oval pores, pocket pores, tubular pores, lamellar pores, nested pores, open pores, closed pores, porosity networks, wavy pores, zigzag pores, star-shaped pores, jagged pores, pyramidal pores, polyhedral pores, prism-shaped pores, web-like pores, tunnel pores, and multi-sized pores. In a preferred embodiment, the nanocomposite is porous, and the pores are in the form of slits.

In some embodiments, the nanocomposite includes a copper oxide (CuO) phase, a magnesium oxide (MgO) phase, a magnesium aluminum oxide ($MgAl_2O_4$) phase, and a graphite-phase carbon nitride (g-$C_3N_4$) phase.

In some embodiments, the phases may include but are not limited to crystalline, amorphous, monoclinic, orthorhombic, tetragonal, hexagonal, cubic, rhombohedral, triclinic, triclinic polymorph, spinel, tenorite, and a combination thereof. In an embodiment, the $MgAl_2O_4$ phase is spinel. In another embodiment, the MgO phase is cubic. In some embodiments, the nanocomposite does not comprise aluminum oxide ($Al_2O_3$). In some embodiments, the nanocomposite is crystalline.

EXAMPLES

The following examples describe and demonstrate a method of photocatalytic degradation with a nanocomposite. The examples are provided solely for illustration and are not to be construed as limitations of the present disclosure, as many variations thereof are possible without departing from the spirit and scope of the present disclosure.

Example 1: Fabricating a Graphite-Phase Carbon Nitride Copper Oxide and Magnesium Aluminum Oxide (g-$C_3N_4$@CuO/$MgAl_2O_4$) Nanocomposite Magnesium nitrate, aluminum nitrate, and copper nitrate were combined in a beaker in pre-determined quantities to produce a copper oxide (CuO) and magnesium aluminum oxide ($MgAl_2O_4$) composite (CuO/$MgAl_2O_4$ composite). About 10 grams (g) of menthol was added as fuel, followed by an addition of 30 milliliters (mL) of distilled water (DW). The beaker was heated until a clear solution was obtained and further heated until the solution dried. The resulting product was ground in a mortar, transferred to a 150 mL porcelain dish, and calcined at 700° C. for 3 hours. The calcinated CuO/$MgAl_2O_4$ composite was cooled to room temperature, weighed, and ground with urea in suitable amounts to produce the g-$C_3N_4$@CuO/$MgAl_2O_4$ nanocomposite with 10 wt. % g-$C_3N_4$, 5 wt. % CuO, and 85 wt. % $MgAl_2O_4$ (10:5:85 wt. %). The mixture was returned to a covered porcelain crucible and heated to 600° C. for 40 minutes before being cooled to room temperature and the 10:5:85 wt. % g-$C_3N_4$@CuO/$MgAl_2O_4$ nanohybrid was collected.

Example 2: Characterizations

X-ray diffraction (XRD) was employed to identify crystalline phases of the g-$C_3N_4$@CuO/$MgAl_2O_4$ nanocomposite using a JDX-8030 X-ray diffractometer (JEOL, Japan). Cu-filtered Cu-Kα radiation (1.5418 Å) powered at 45 kilovolts (kV) and 10 milliamperes (mA) was utilized to run diffraction patterns. Samples were tested at ambient temperature. Surface morphologies of the samples were analyzed using transmission electron microscopy (TEM), selected area electron diffraction (SAED) analysis, and high-resolution transmission electron microscopy (HR-TEM). Nitrogen ($N_2$) adsorption isotherms, obtained at 77 kelvin (K) using a Micrometrics ASAP 2020 Brunauer-Emmett-Teller (BET) analyzer, were used to evaluate surface characteristics, BET surface area, total pore volume (Vp), and mean pore diameter (d). Prior to measurement, the samples were degassed for three hours at 200° C. under a reduced pressure of about 5 to 10 torr.

Figure 3:
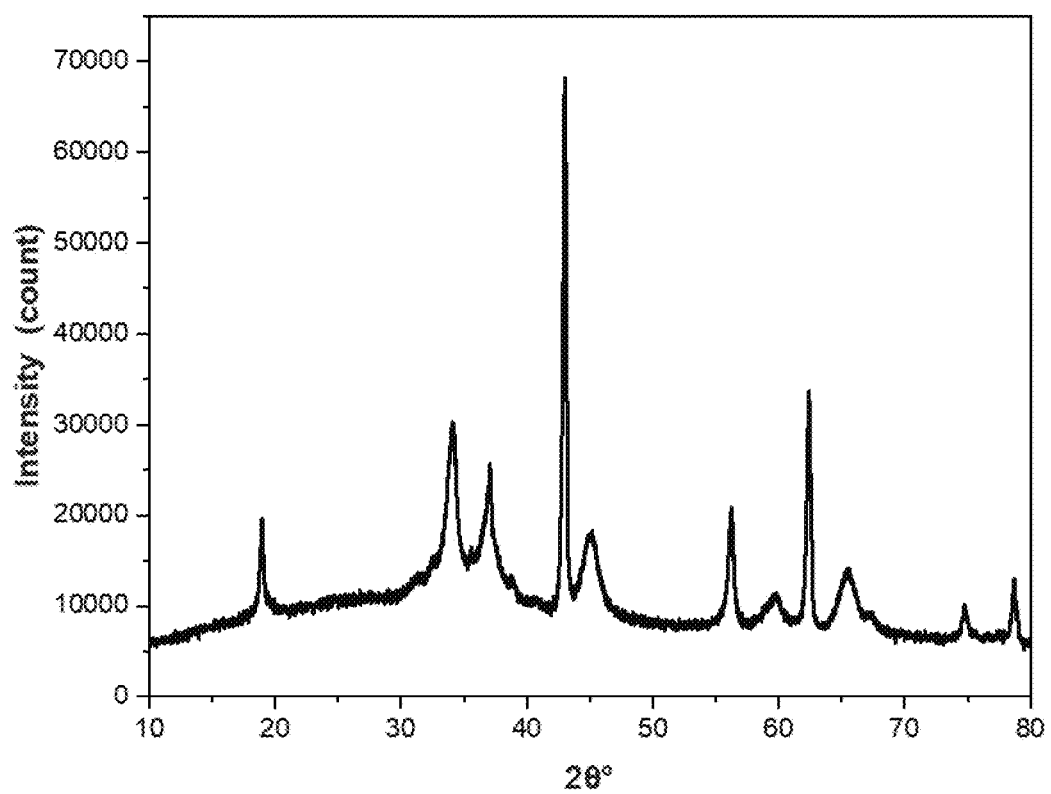
FIG. 3 is a graph depicting X-ray diffraction (XRD) patterns of a graphite-phase carbon nitride copper oxide and magnesium aluminum oxide ($g-C_3N_4@CuO/MgAl_2O_4$) nanocomposite, according to certain embodiments.

Crystallinity and phases of the g-$C_3N_4$@CuO/$MgAl_2O_4$ nanocomposite were analyzed using XRD, as shown in FIG. 3. The pronounced peaks and elevated intensity values indicate that the nanocomposite possesses a highly crystalline structure. Analysis of the diffraction patterns, using typical powder diffraction file (PDF) cards, shows the existence of copper(II) oxide (CuO), magnesium oxide (MgO), magnesium aluminate spinel ($MgAl_2O_4$), and graphitic carbon nitride (g-$C_3N_4$) phases. The $MgAl_2O_4$ spinel phase was indexed through diffraction peaks at 2θ values of 18.9°, 37.0°, 38.9°, 45.2°, 56.1°, 65.01°, 74.7°, and 78.7°, corresponding to the Miller indices (111), (311), (222), (400), (422), (440), (620), and (622), respectively. Planes of the cubic phase of $MgAl_2O_4$ spinel were identified in the crystallography open database (COD) No. 9002164. The cubic phase of MgO, identified by COD No. 9006789, was detected at 2θ values of 37.0°, 43.0°, 62.4°, and 74.7°, corresponding to diffractions originating from planes (111), (200), (220), and (311), respectively. Coexistence of MgO and $MgAl_2O_4$ spinel phase has been previously reported [Singh, D. et al., Citric acid coated magnetic nanoparticles: Synthesis, characterization and application in removal of Cd(II) ions from aqueous solution, *Journal of Water Process Engineering*, 2014, 4, 233-241, which is incorporated herein by reference in its entirety]. Diffractions at 2θ values of 38.9° and 65.5° were attributed to the tenorite phase of CuO, which was identified by COD No. 9016326. The presence of mild diffraction from CuO signifies its total dissolution across the lattices of both spinel and g-$C_3N_4$. The diffractions associated with g-$C_3N_4$ were recorded at 2θ values of 36.9°, 45.8°, and 59.1°, and identified by COD No. 1534042. No other phases, such as $Al_2O_3$, were identified, supporting synthesis of CuO/$MgAl_2O_4$/g-$C_3N_4$.

Figure 4A:
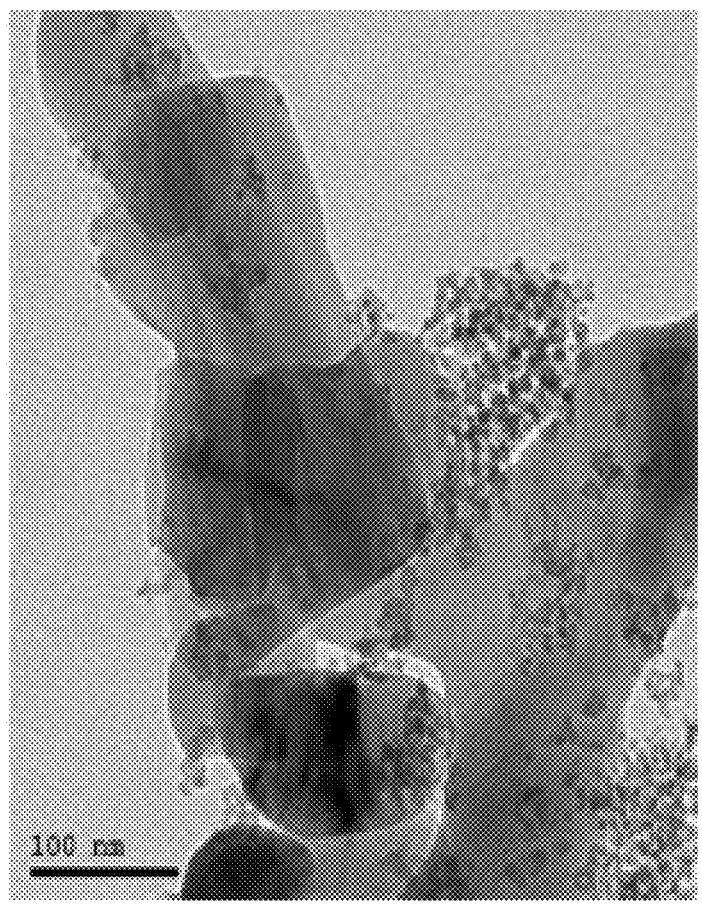
FIG. 4A is a transmission electron microscopy (TEM) image of the $g-C_3N_4@CuO/MgAl_2O_4$ nanocomposite, according to certain embodiments.
Figure 4B:
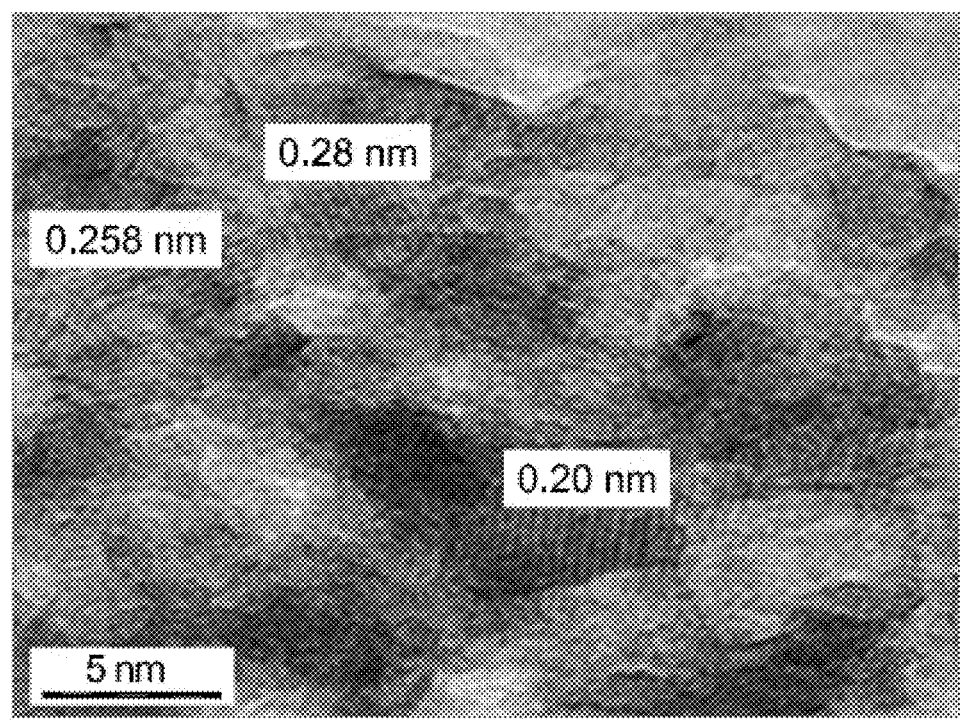
FIG. 4B is a high-resolution transmission electron microscopy (HR-TEM) image of the $g-C_3N_4@CuO/MgAl_2O_4$ nanocomposite, according to certain embodiments.
Figure 4C:
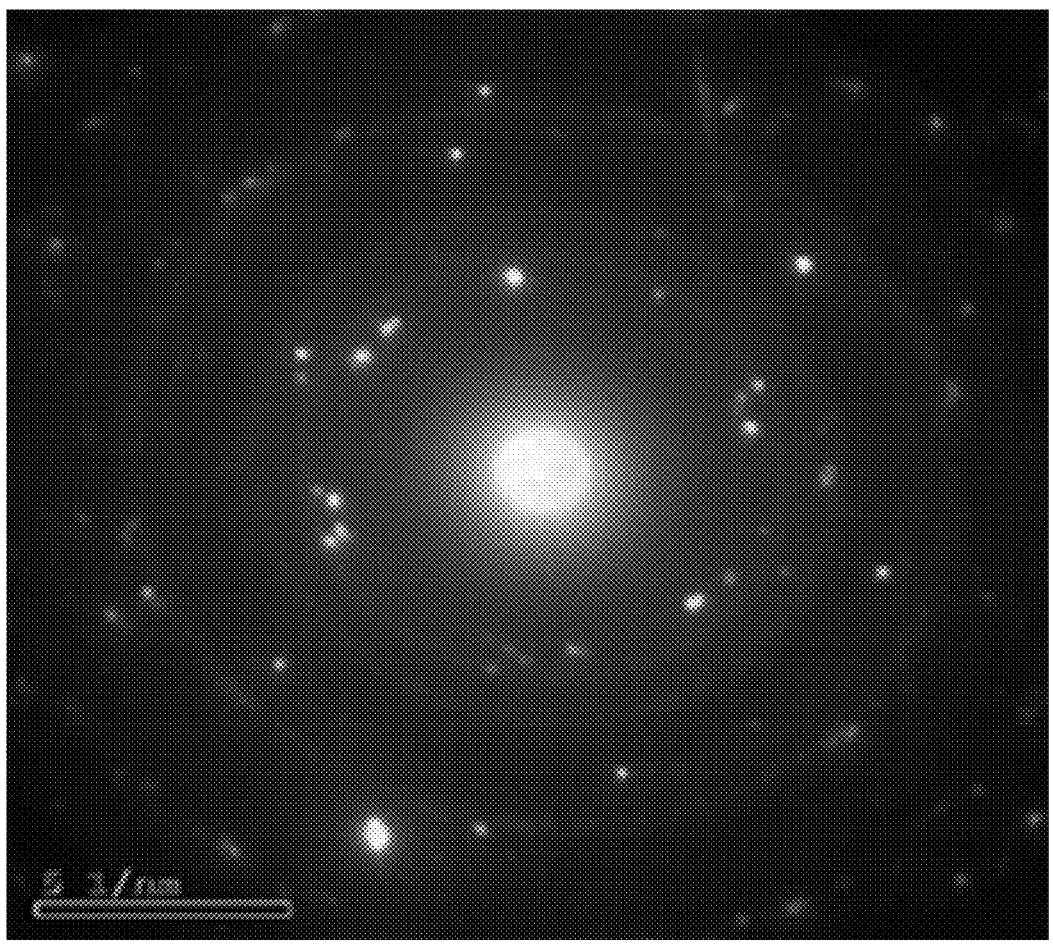
FIG. 4C is a selected area electron diffraction (SAED) pattern of the $g-C_3N_4@CuO/MgAl_2O_4$ nanocomposite, according to certain embodiments.
Figure 4D:
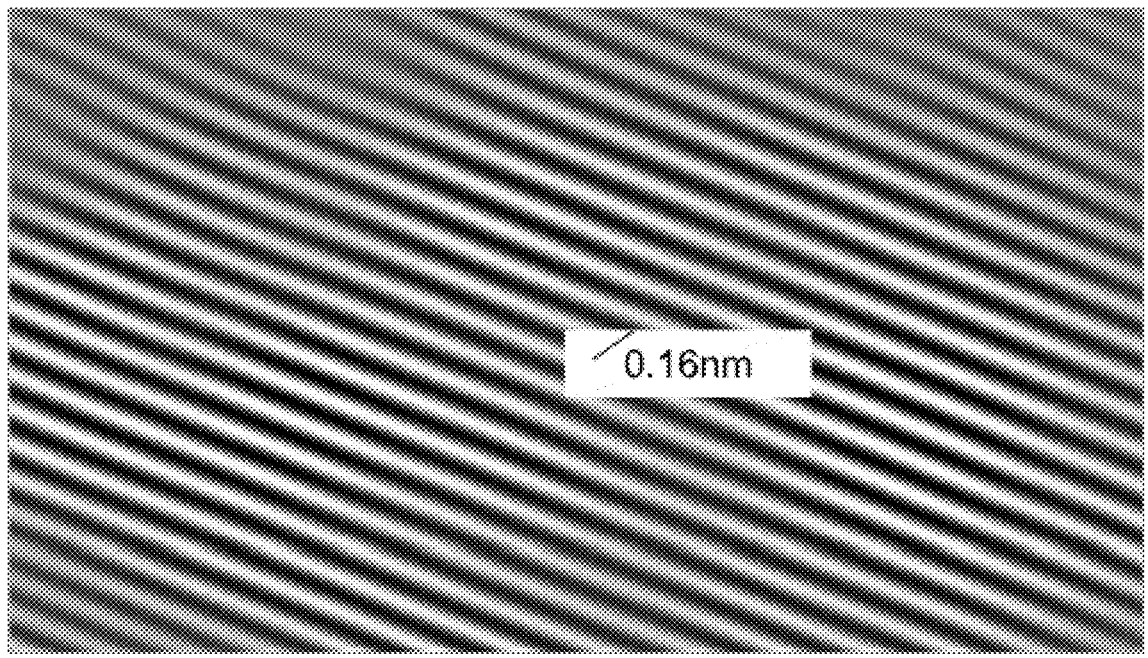
FIG. 4D is a fast Fourier transform (FFT) pattern of the $g-C_3N_4@CuO/MgAl_2O_4$ nanocomposite, according to certain embodiments.
Figure 4E:
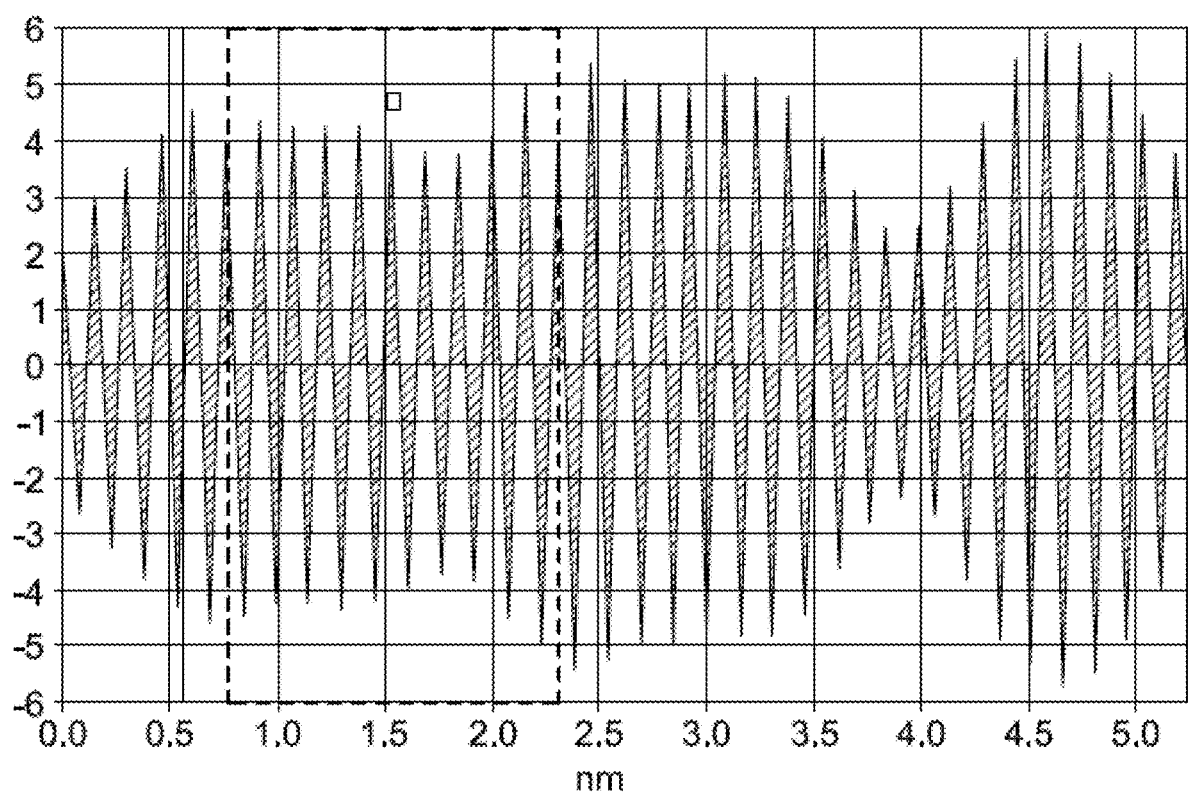
FIG. 4E is an inverse fast Fourier transform (IFFT) pattern of the $g-C_3N_4@CuO/MgAl_2O_4$ nanocomposite, according to certain embodiments.

TEM images of the g-$C_3N_4$@CuO/$MgAl_2O_4$ nanocomposite are shown in FIG. 4A. The TEM images show a two-dimensional porous structure constructed with curled and wrinkled nanosheets and platelets of the g-$C_3N_4$ with an average width of 135 nm and an average length of 222 nm. The TEM image shows well-dispersed homogeneous spherical metal oxide nanoparticles, with a size of 5.4 nm, on nanosheets of g-$C_3N_4$. The corresponding HR-TEM analysis of the nanocomposite illustrates a plane spacing of 0.33 nm, related to the plane (002) of carbon nitride and a plane spacing 0.25 nm and 0.2 nm, related to the spinel planes (222) and (400), respectively, characterizing a heterostructure formation, as shown in FIG. 4B. FIG. 4C depicts an SAED pattern revealing diffraction spots with interplanar spacing of 0.23 nm, 0.219 nm, 0.17 nm, 0.146 nm, 0.122 nm, and 0.10 nm, corresponding to (111), (CuO), (200) (MgO), (422) (spinel), (220) (MgO), (620) (spinel), and (622) (spinel) diffraction planes, respectively. The fast Fourier transform (FFT) (FIG. 4D) and inverse fast Fourier transform (IFFT) (FIG. 4E) measurements showed a 'd' value of 0.16 nm for the g-$C_3N_4$@CuO/$MgAl_2O_4$ nanocomposite, indicating a lattice spacing of (422), which further indicates development of a spinel structure.

Figure 5A:
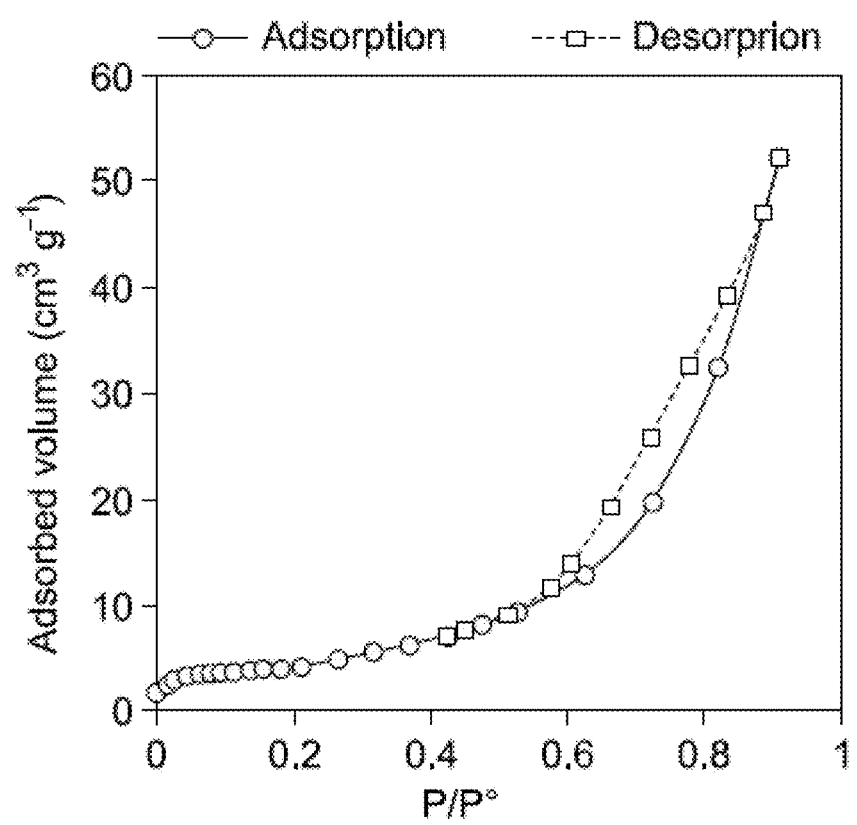
FIG. 5A is a graph depicting a nitrogen ($N_2$) adsorption-desorption isotherm of the $g-C_3N_4@CuO/MgAl_2O_4$ nanocomposite, according to certain embodiments.
Figure 5B:
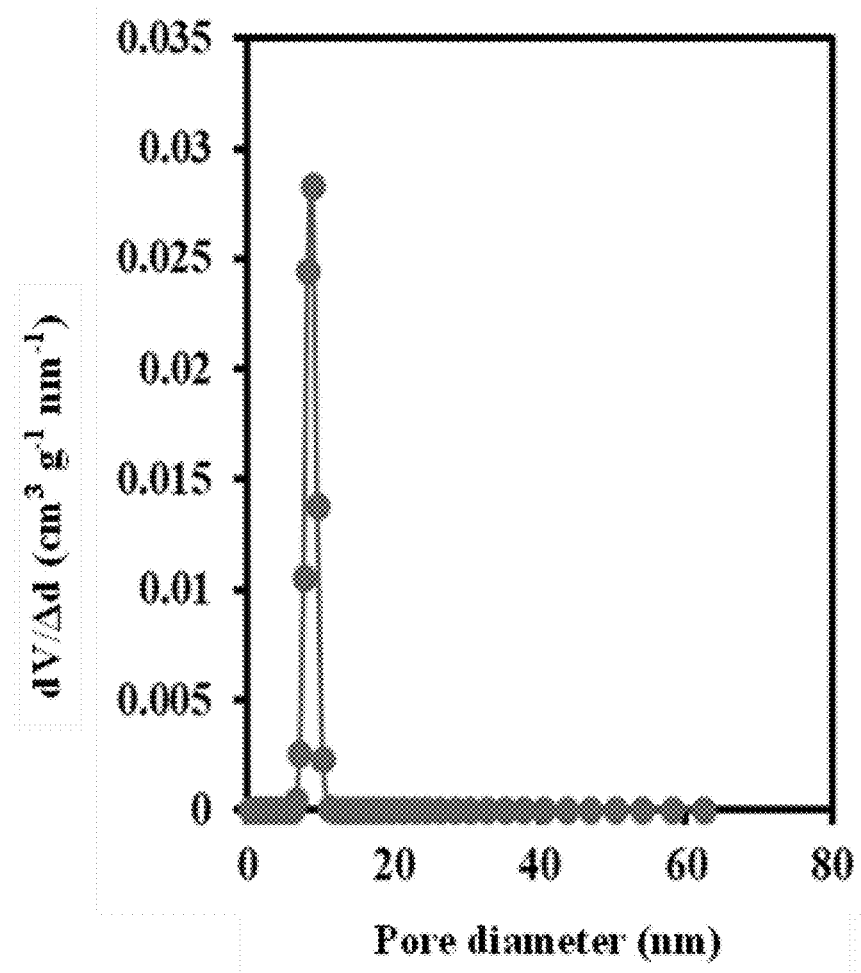
FIG. 5B is a graph depicting dV/ΔV variation ($cm^3$ $g^{-1}$ $nm^{-1}$) versus pore diameter (nm) of the $g-C_3N_4@CuO/MgAl_2O_4$ nanocomposite, according to certain embodiments.

Surface properties of the composite were examined using nitrogen adsorption-desorption isotherms of the g-$C_3N_4$@CuO/MgAl$_2$O$_4$ nanocomposite, as shown in FIGS. 5A-5B. The nitrogen sorption isotherm of the nanocomposite corresponded to a type IV, with a clear hysteresis loop, indicating the formation of mesoporous structures; however, a shift in the loop to a relatively lower pressure (P/P$_0$=0.59 to 1) suggested a decrease in the size of the mesopores, which may have resulted from deposition of metal oxide particles in the wide pores of g-$C_3N_4$. The BET surface area of the g-$C_3N_4$@CuO/MgAl$_2$O$_4$ nanocomposite was calculated to be 23.21 m$^2$/g. The specific surface area reflects dispersion of metal oxide nanoparticles on the g-$C_3N_4$. Pore size distribution curves, plotted using the BJH method, for the g-$C_3N_4$@CuO/MgAl$_2$O$_4$ nanocomposite exhibited unimodal distribution with average pore diameters maximized at 8.34 nm and a pore volume of 0.081 cubic centimeters per gram (cm$^3$/g). The isotherms belonged to the category H3 type of pores, which do not exhibit limiting adsorption at high P/P$_0$ and arise due to aggregation of plate-like particles giving rise to slit-shaped pores. The assembly of the g-$C_3N_4$@CuO/MgAl$_2$O$_4$ nanocomposite favored the generation of a mesoporous array.

Utilization of wide-range visible light region in photocatalytic processes use a low band gap energy (1.77 to 1.92 eV) to be a candidate for visible light absorption and use in photocatalytic purposes. Use of visible light induced photocatalysts may displace use of harmful ultraviolet light induced photocatalysts. Absorbance of the g-$C_3N_4$@CuO/MgAl$_2$O$_4$ material was measured in the range of 200 to 800 nm. The Tauc plot (Equation 1) was employed to determine the band gap energy (E$_g$) for the nanocomposite.

$$\alpha h\gamma = A(h\gamma - E_g)^{1/2} \quad (1)$$

"h" represents Planck's constant, "α" represents the absorption coefficient, and "γ" represents the photonic frequency.

Figure 6:
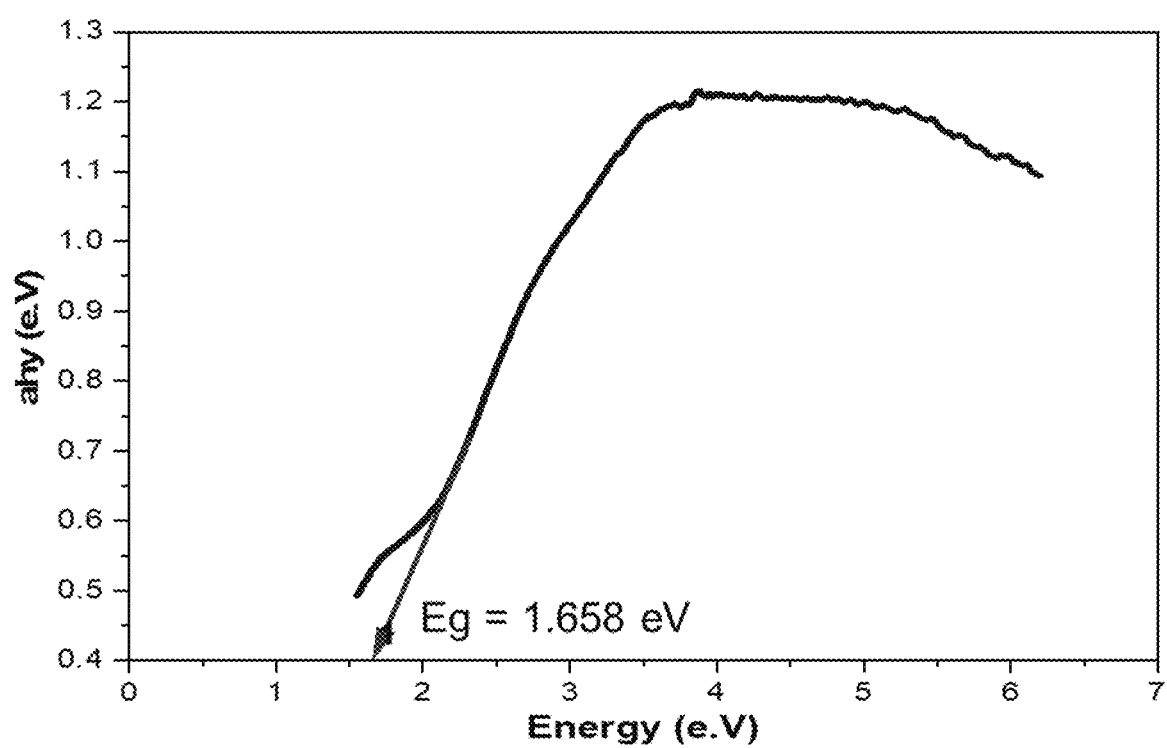
FIG. 6 is a graph depicting a Tauc plot of the $g-C_3N_4@CuO/MgAl_2O_4$ nanocomposite, according to certain embodiments.

As seen in FIG. 6, the E$_g$ of the nanocomposite is 1.658 eV, which is similar to that of BiOI. BiOI is known for its high activities in degrading organic compounds under visible light [Nzaba, S. K. M. et al., Comparative study of visible-light active BiOI and N,Pd—TiO$_2$ photocatalysts: catalytic ozonation for dye degradation, *Colloids and Surfaces A: Physiochemical and Engineering Aspects*, 2024, 684, 113167, which is incorporated herein by reference in its entirety]. The g-$C_3N_4$@CuO/MgAl$_2$O$_4$ material may be used as a photocatalyst within the visible light region.

Aspects of the present disclosure provide the method of photocatalytic degradation using the nanocomposite synthesized herein. The g-$C_3N_4$@CuO/MgAl$_2$O$_4$ nanocomposite photocatalytic active and may effectively degrade pollutants from a wastewater sample. The g-$C_3N_4$@CuO/MgAl$_2$O$_4$ nanocomposite may be effective for efficient degradation of a plurality of industrial and pharmacological pollutants from various polluted water bodies.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A method of photocatalytic degradation, comprising:
   contacting a nanocomposite with a solution comprising one or more pollutants,
   wherein the nanocomposite is a graphite-phase carbon nitride copper oxide and magnesium aluminum oxide (g-$C_3N_4$@CuO/MgAl$_2$O$_4$) material,
   wherein the g-$C_3N_4$@CuO/MgAl$_2$O$_4$ material comprises a graphite-phase carbon nitride (g-$C_3N_4$) in an amount of 2 to 20 percent by weight (wt. %), copper oxide in an amount of 1 to 10 wt. %, and magnesium aluminum oxide (MgAl$_2$O$_4$) in an amount of 75 to 95 wt. % based on a total weight of the g-$C_3N_4$@CuO/MgAl$_2$O$_4$ material,
   irradiating the nanocomposite with light having a wavelength of 400 to 800 nm in the absence of UV light to photocatalytically degrade the one or more pollutants in the solution.

2. The method of claim 1, wherein the nanocomposite has a band gap energy value of 1.6 to 1.7 eV.

3. The method of claim 1, wherein irradiating the nanocomposite occurs at a wavelength of 480 to 700 nm.

4. The method of claim 1, wherein the g-$C_3N_4$ is in the form of nanosheets having an average length of 100 to 500 nm and an average width of 50 to 250 nm.

5. The method of claim 4, wherein the copper oxide and the MgAl$_2$O$_4$ are in the form of nanoparticles having an average size of 2 to 10 nm and wherein the copper oxide and the MgAl$_2$O$_4$ nanoparticles are dispersed on the g-$C_3N_4$ nanosheets.

6. The method of claim 1, wherein the nanocomposite has a Brunauer-Emmett-Teller (BET) surface area of 15 to 30 m$^2$ g$^{-1}$.

7. The method of claim 1, wherein the nanocomposite is porous and has an average pore diameter of 5 to 10 nm.

8. The method of claim 1, wherein the nanocomposite is porous and has an average pore volume of 0.01 to 0.2 cm$^3$ g$^{-1}$.

9. The method of claim 1, wherein the nanocomposite is porous, and the pores are in the form of slits.

10. The method of claim 1, wherein the g-$C_3N_4$@CuO/MgAl$_2$O$_4$ material comprises a graphite-phase carbon nitride (g-$C_3N_4$) in an amount of 5 to 15 percent by weight (wt. %), copper oxide in an amount of 3 to 7 wt. %, and magnesium aluminum oxide (MgAl$_2$O$_4$) in an amount of 80 to 90 wt. % based on a total weight of the g-$C_3N_4$@CuO/MgAl$_2$O$_4$ material.

11. The method of claim 1, wherein the nanocomposite is crystalline.

12. The method of claim 1, wherein the nanocomposite comprises a copper oxide (CuO) phase, a magnesium oxide (MgO) phase, a magnesium aluminum oxide (MgAl$_2$O$_4$) phase, and a graphite-phase carbon nitride (g-$C_3N_4$) phase.

13. The method of claim 12, wherein the MgAl$_2$O$_4$ phase is spinel.

14. The method of claim 12, wherein the MgO phase is cubic.

15. The method of claim 1, wherein the nanocomposite does not comprise aluminum oxide (Al$_2$O$_3$).

16. The method of claim 1, wherein the one or more pollutants is a dye.

17. The method of claim 1, wherein the irradiating occurs for 0.5 to 90 minutes.

18. The method of claim 1, wherein the irradiating occurs at a temperature of 10 to 50° C.

19. The method of claim 1, wherein the nanocomposite is made by a process, comprising:
   mixing a magnesium salt, an aluminum salt, a copper salt, and a fuel in water to form a mixture;
   heating the mixture to form a solid product;
   calcinating the solid product at a temperature of 600 to 800° C. for 2 to 4 hours to form a product; and mixing the product with urea and heating to a temperature of 550 to 650° C. for 20 to 60 minutes to form the nanocomposite.

20. The method of claim 19, wherein the fuel is menthol.

* * * * *